US012613118B2

(12) United States Patent
Marsh et al.

(10) Patent No.: US 12,613,118 B2
(45) Date of Patent: Apr. 28, 2026

(54) APPARATUS FOR MEASURING THE VELOCITY OF A FLUID

(71) Applicant: BrickHouse Innovations, LLC, Frederick, MD (US)

(72) Inventors: Lawrence B. Marsh, Frederick, MD (US); John F. Marsh, Frederick, MD (US)

(73) Assignee: BrickHouse Innovations, LLC, Frederick, MD (US)

( * ) Notice: Subject to any disclaimer, the term of this patent is extended or adjusted under 35 U.S.C. 154(b) by 278 days.

(21) Appl. No.: 18/458,734

(22) Filed: Aug. 30, 2023

(65) Prior Publication Data

US 2025/0076092 A1     Mar. 6, 2025

(51) Int. Cl.
  G01F 1/58 (2006.01)
  G01F 15/14 (2006.01)
(52) U.S. Cl.
  CPC .............. G01F 1/588 (2013.01); G01F 15/14 (2013.01)
(58) Field of Classification Search
  CPC ................................. G01F 1/588; G01F 15/14
  USPC ....................................................... 73/861.15
  See application file for complete search history.

(56) References Cited

U.S. PATENT DOCUMENTS

| | | | | |
|---|---|---|---|---|
| 4,459,858 | A | * | 7/1984 | Marsh ........................ G01F 1/58 |
| | | | | 73/861.15 |
| 2015/0037986 | A1 | | 2/2015 | Wu et al. |
| 2018/0000353 | A1 | | 1/2018 | Thieme et al. |
| 2022/0001114 | A1 | | 1/2022 | Karlsson et al. |
| 2023/0408310 | A1 | * | 12/2023 | Sevar ........................ G01F 1/56 |

FOREIGN PATENT DOCUMENTS

| | | | | | |
|---|---|---|---|---|---|
| EP | | 0305609 | A1 | * | 3/1989 ............. G01P 5/086 |

* cited by examiner

*Primary Examiner* — Nathaniel T Woodward
(74) *Attorney, Agent, or Firm* — Laubscher & Fretwell, P.C.

(57) ABSTRACT

An apparatus for measuring the velocity of a fluid includes an elongated housing having at least one side wall, a plurality of sensors arranged in spaced relation along the housing side wall, and a processor connected with the sensors and configured to process signals from the sensors to measure velocities of a fluid adjacent the apparatus when the apparatus is in contact with the fluid. Each of the sensors includes an electromagnet enclosed in the housing and a pair of electrodes arranged opposite each other on an outer surface of the housing. The electromagnets are energized by the processor to create an electromagnetic field in a fluid when the apparatus is in contact with the fluid, and the pair of electrodes is configured to produce an electrical signal in response to a velocity of the fluid when it flows through the electromagnetic field.

10 Claims, 5 Drawing Sheets

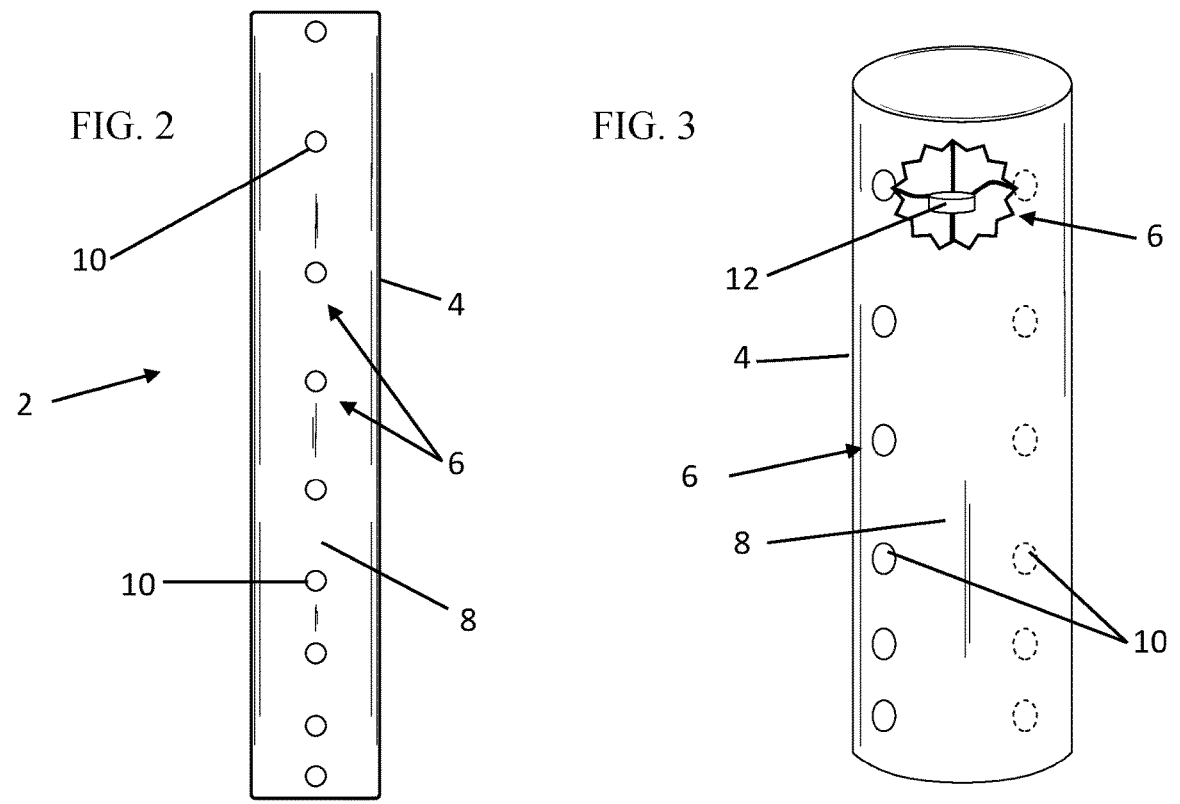
FIG. 2
FIG. 3
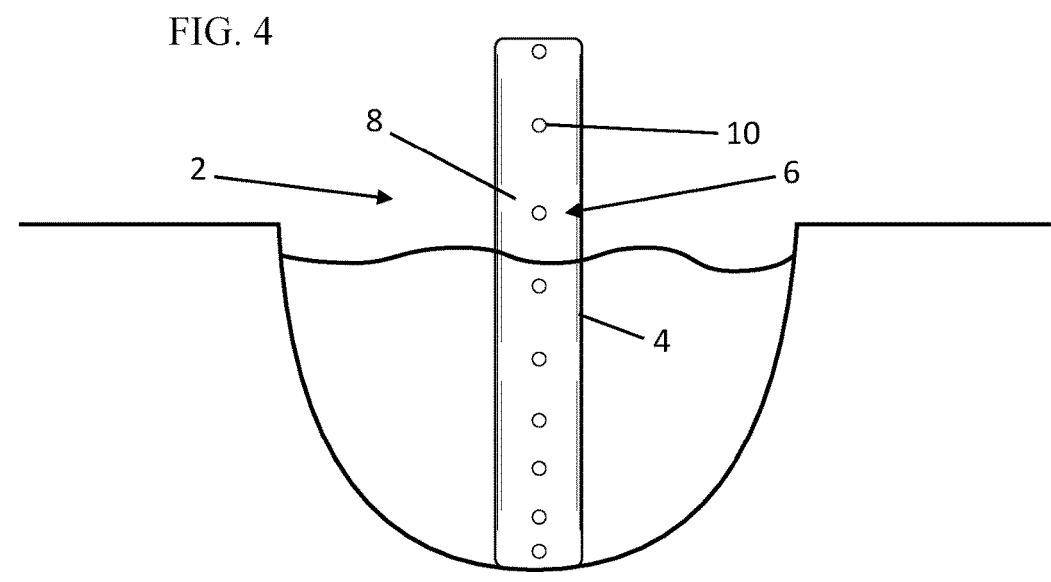
FIG. 4

APPARATUS FOR MEASURING THE VELOCITY OF A FLUID

BACKGROUND

The present disclosure relates generally to measuring the velocity of a fluid, and more specifically to an apparatus that measures the velocity of a fluid in an open or closed channel.

Apparatuses for measuring the velocity of fluid are well known in the prior art. U.S. Pat. No. 4,688,432 discloses an apparatus with velocity sensors used to determine an average of velocity of a fluid in a full conduit. The apparatus includes multiple electrodes along the sensor housing which are used for sensing the individual velocities existing at the location of each electrode pair. A single magnet is arranged within and extends along the length of the housing, and a plurality of pairs of electrodes are arranged along the housing, each electrode being opposite its paired electrode. The electrodes are connected to one another, and an average velocity of the electrodes is computed. Though the apparatus of the '432 patent provides significant improvements over other known apparatuses, variations in contact resistance by each electrode pair causes inaccuracies.

FIG. 1 shows a schematic of electrode pairs, such as with those of the '432 patent, connected to each other in a hardwired fashion to be sampled by a processor. The equation for calculating the average velocity of a fluid based on an electrical signal produced by these electrodes, where all contact resistances are equal, is:

$$E_c = \frac{E_1}{3} + \frac{E_2}{3} + \frac{E_3}{3}$$

Unfortunately, where values of contact resistance are unequal, this equation cannot be used to determine average velocity. Importantly, field data has shown that the contact resistance of the sensors for the electrodes of the '432 patent can vary by as much as 50% causing significant errors. There is thus a need for a new apparatus for measuring the velocity of fluid that overcomes the inaccuracies associated with the apparatus of the '432 patent.

SUMMARY OF THE INVENTION

Accordingly, it is an object of the present disclosure to provide an apparatus for measuring the velocity of a fluid. The apparatus includes an elongated housing having at least one side wall, a plurality of sensors arranged in spaced relation along the housing side wall, and a processor connected with the sensors and configured to process signals from the sensors to measure velocities of a fluid adjacent the apparatus when the apparatus is in contact with the fluid. Each of the sensors includes an electromagnet, which is enclosed within the housing, and a pair of electrodes connected with the electromagnet and arranged opposite each other on an outer surface of the housing. The electromagnets are energized by the processor to create an electromagnetic field in a fluid when the apparatus is in contact with the fluid, and the pair of electrodes are configured to produce an electrical signal in response to a velocity of the fluid when it flows through the electromagnetic field. Preferably, each of the sensors further includes a differential amplifier connected with the processor to buffer each pair of electrodes.

In one embodiment, the processor is configured to energize each of the electromagnets sequentially along a length of the elongated housing and sequentially sample signals from the electrodes.

In another embodiment, a distance between each of the sensors progressively increases from a first end of the housing to a second end. In this embodiment, there is preferably a surface velocity sensor connectable with the housing to produce an electrical signal in response to a velocity of a surface fluid flowing in an open channel. The surface velocity sensor includes a housing having at least one side wall, an electromagnet enclosed within the housing, and a pair of electrodes extending below a lower end of the housing. The surface velocity sensor housing includes an attachment mechanism for attaching the surface velocity sensor with the elongated housing of the apparatus. When the elongated housing is in contact with a fluid in an open channel, and the surface velocity sensor housing is connected with the elongated housing, the electrodes of the surface velocity sensor are arranged such that they contact the surface of the fluid in the open channel. A processor is connected with the surface velocity sensor to energize its electromagnet to generate an electromagnetic field at the surface of a fluid and the electrodes produce an electrical signal in response to a velocity of the fluid flowing through the electromagnetic field. The processor samples signals from the electrodes for use in computing velocities of the fluid.

In yet another embodiment, the plurality of sensors on the elongated housing are symmetrically arranged along the elongated housing sidewall about a midpoint with a distance between the sensors progressively decreasing from the midpoint to either end of the elongated housing.

BRIEF DESCRIPTION OF THE DRAWINGS

Other objects and advantages of the disclosure will become apparent from a study of the following specification when viewed in the light of the accompanying drawing, in which:

FIGS. 2 and 3 are front and perspective views, respectively, of one embodiment of an apparatus for measuring the velocity of a fluid according to the present disclosure;

FIG. 4 is a schematic diagram of the apparatus of FIGS. 2 and 3 in an open channel;

DETAILED DESCRIPTION

Figure 1:
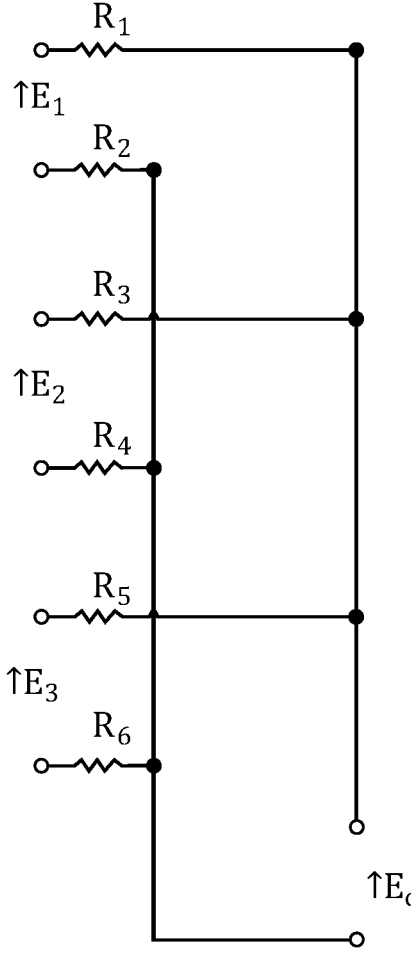
FIG. 1 is a schematic diagram of a prior art circuit for sensing velocity of a fluid.

The present disclosure relates to profiling sensor apparatuses for both enclosed pipe and open channel applications. Referring first to FIGS. 2-6, a first embodiment of such an apparatus 2 is shown. It includes an elongated housing 4 which has sensors 6 arranged on a housing side wall 8. The sensors include a plurality of electrodes 10 arranged in pairs along the length of the housing and local electromagnets 12 (FIG. 2) connected with the electrodes and arranged within the housing. A central processor 14, shown in FIGS. 9 and 10, is connected with the sensors to energize the electromagnets and receive electrical signals therefrom.

When the device 2 is placed in an open channel, as shown in FIG. 3, the magnets 12 of the sensors 6 are energized via the processor 14 (FIG. 9) and each electromagnet generates an electromagnetic field. As fluid adjacent to the housing 4 flows through the electromagnetic fields created by each electromagnet, the respective pair of electrodes 10 produce signals in response to a velocity of the fluid and send the signal to the processor, which is demonstrated in the FIG. 10 schematic.

Figure 9:
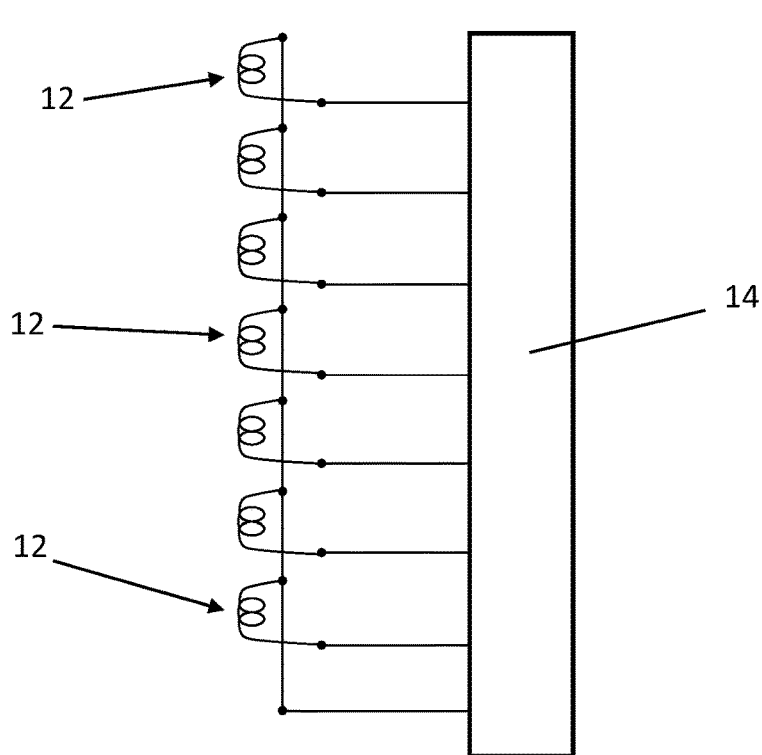
FIG. 9 is a schematic diagram of a plurality of electromagnets connected with a processor according to the present disclosure.

FIG. 9 shows each electromagnet 12 separately connected with the processor 14 such that the processor can separately energize each electromagnet. Preferably, the electromagnets are energized sequentially along the length of the elongated housing 4 (FIG. 2-4).

Figure 10:
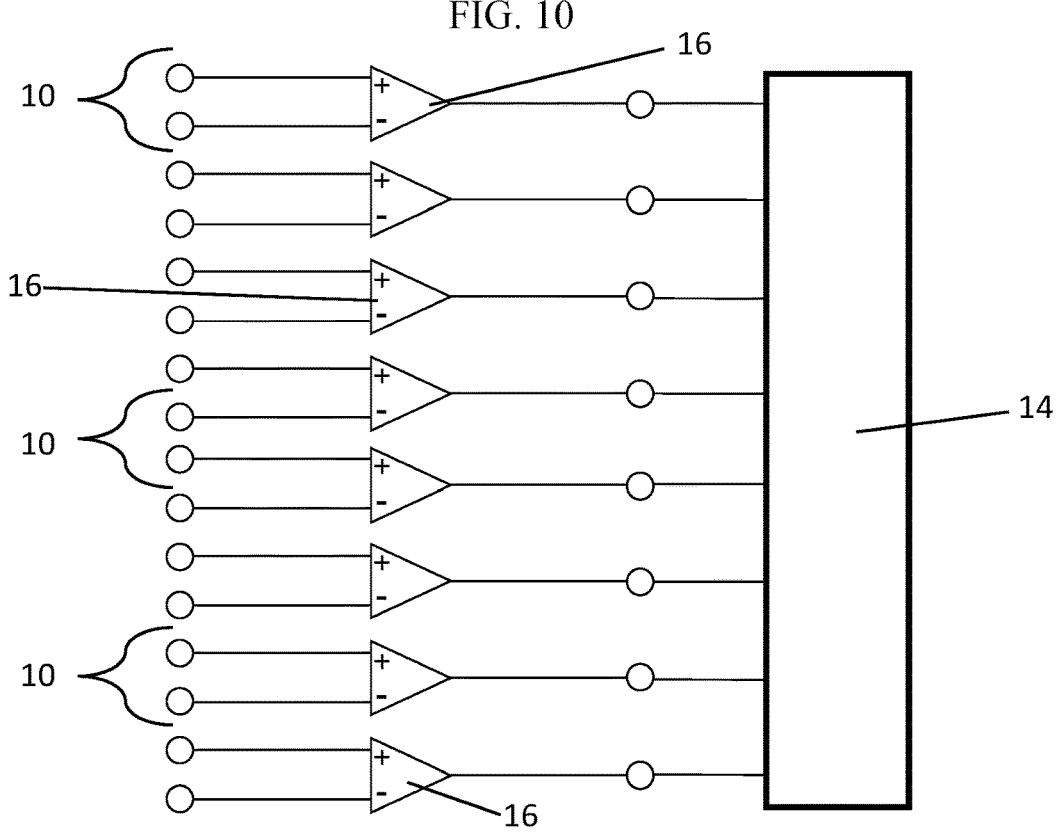
FIG. 10 is a schematic diagram of pairs of electrodes connected with respective differential amplifiers and a processor according to the present disclosure.

As shown in FIG. 10, each pair of electrodes 10 is connected with a differential amplifier 16 which is connected with the processor 14. The amplifier buffers each electrode of a pair of electrodes, which aids in overcoming potential electrode resistance inaccuracies, such as described above in relation to the device of U.S. Pat. No. 4,688,432. Similar to the electromagnets shown in FIG. 9, each pair of electrodes 10 with a differential amplifier 18 are separately connected to the processor 14 such that the processor can separately sample signals from the electrode pairs to obtain velocities at different locations of the housing 4. Preferably, the processor energizes the electromagnet and samples electrodes of the same sensor together.

Referring again to FIGS. 1-3, the device 2 of this embodiment includes electrodes 10 arranged in pairs such that a distance from one pair to another increases from the lower end of the housing to the upper end of the housing. This device is preferably used to measure fluid velocities in an open channel, as depicted in FIG. 3.

Figure 5:
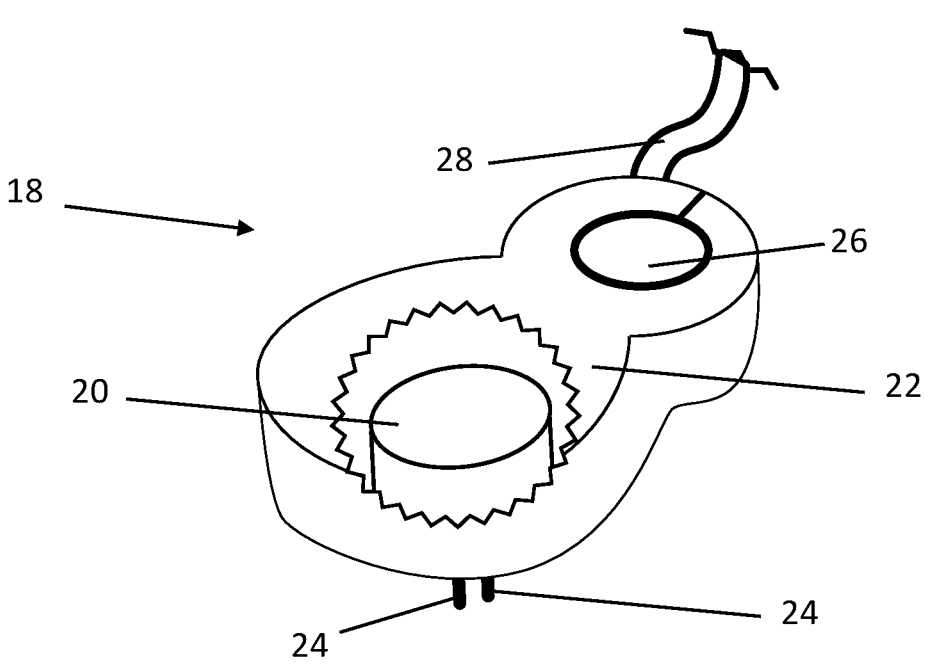
FIG. 5 is a perspective view of a surface velocity sensor according to the present disclosure.

Referring now to FIGS. 4 and 5, the device 2 for an open channel preferably includes an auxiliary sensor 18, also referred to herein as a surface velocity sensor, which can be connected with the elongated housing 4 to measure the velocity of fluid at the surface thereof. Similar to the sensors 6 on the housing 4, the auxiliary sensor 18 is configured to produce an electrical signal in response to a velocity of surface fluid flowing in the open channel and transmit the signal to the processor 14. The auxiliary sensor includes an electromagnet 20 arranged within a housing 22, a pair of electrodes 24 extending from a bottom of the housing, a mounting assembly 26 for mechanically connecting the auxiliary sensor with the device housing 4, and a wire 28 for electrically connecting the auxiliary sensor with a processor (not shown). As with the elongated housing sensors 6, a processor is connected with the magnet 20 and electrodes 24 energizes the magnet to produce an electromagnetic field through which surface fluid passes, and the electrodes produce an electrical signal in response to a velocity of the surface level fluid as it passes through the electromagnetic field. The signal is sampled by the processor. Preferably, the mounting assembly is slidable along the elongated housing and then secured at a desired height to ensure the electrodes are properly in contact with fluid at the surface thereof.

The auxiliary sensor 18 is used to enable measurements of the surface velocity without unduly disturbing the local velocity for the sensors 6 arranged along the elongated housing 4. The placement of this surface velocity sensor provides a velocity end point at the fluid surface to be added to the rest of the velocity points throughout the fluid column—from the bottom of the channel to the fluid surface. As noted above, the surface sensor is movable along the elongated housing so that it can be positioned just above the surface of the water so that its electrodes 24 remain in contact with the water. From the array of sensing locations 10 along the submerged portion of the elongated housing 4, the central processor 14 can obtain the average velocity, display the velocity profile, and perform other manipulations of the data. Additionally, the relationship between the surface velocity and the calculated average velocity can be obtained. This is an improvement over surface sensors known in the art, which typically involve non-contact techniques such as radar and optical cameras that require "ground verification" to confirm their accuracy in determining flow.

Figure 6:
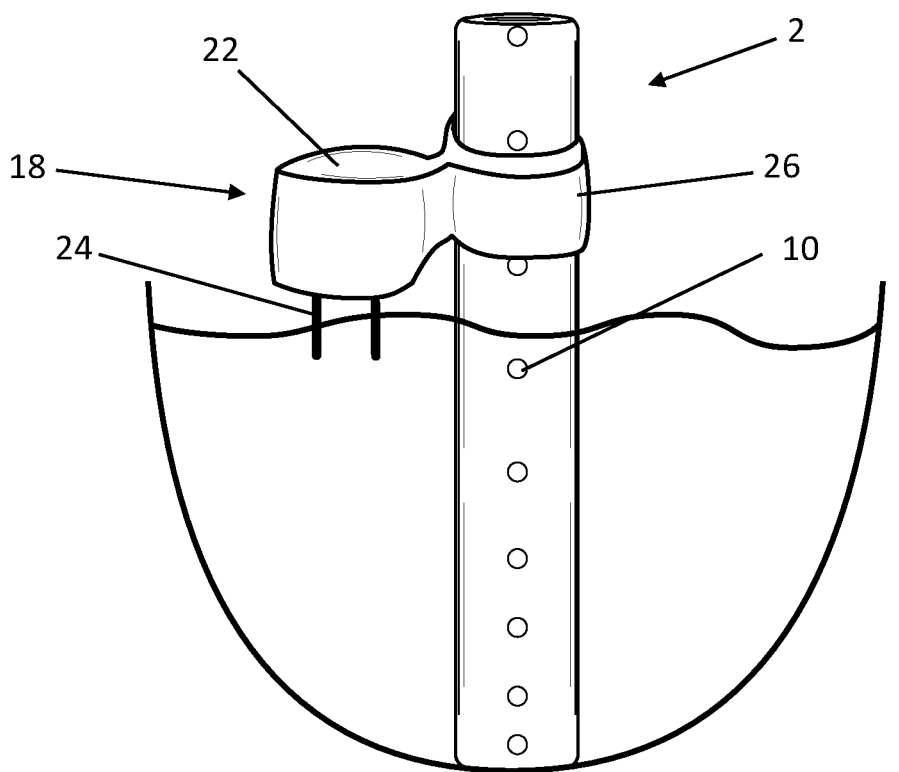
FIG. 6 is a schematic diagram of the surface velocity sensor of FIG. 5 connected with the apparatus of FIGS. 2 and 3 in contact with an open channel.
Figure 7:
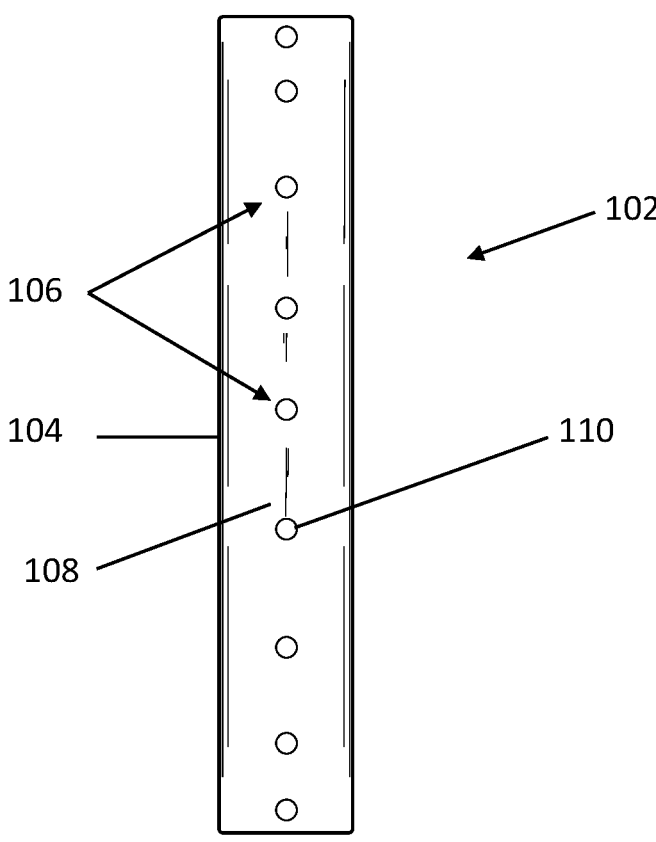
FIG. 7 is a front view of a second embodiment of an apparatus for measuring the velocity of a fluid according to the present disclosure.
Figure 8:
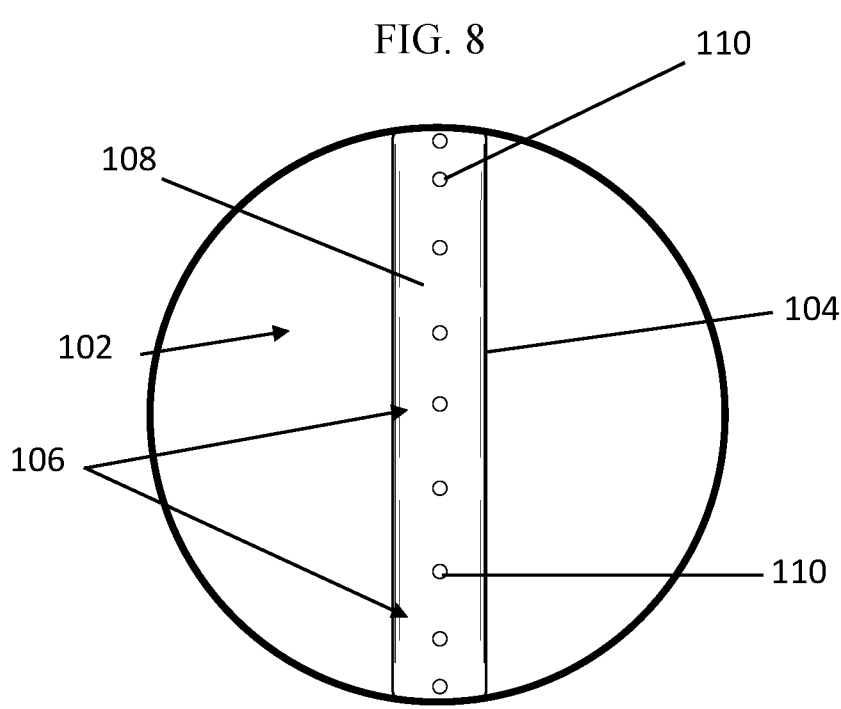
FIG. 8 is a schematic diagram of the apparatus of FIG. 7 in a closed channel.

Referring now to FIGS. 6 and 7, a similar device 102 is shown. This device also includes an elongated housing 104 having sensors 106 arranged on a housing side wall 108. The sensors include a plurality of electrodes 110 arranged in pairs along the length of the housing and local electromagnets (as sown in FIG. 2) arranged within the housing and connected with a processor 114 (FIG. 9). The central processor is connected with the sensors to energize them and receive electrical signals from them. As shown in FIGS. 8 and 9, and described above, the electromagnets and electrodes are each connected with the processor such that they can be energized and sampled in sequence. Each electrode pair is also preferably connected with a differential amplifier to buffer the electrodes.

Referring again to FIGS. 6 and 7, the sensors 106 are arranged such that a distance between each pair of electrodes 110 along the length of the elongated housing 104 progressively decreases symmetrically about a midpoint of the elongated housing.

Although the above description is with reference to particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. An apparatus for measuring the velocity of a fluid, comprising:
  (a) an elongated housing having at least one side wall;
  (b) a plurality of sensors arranged in spaced relation along said elongated housing side wall, each sensor including:
    (1) an electromagnet enclosed within said housing, said electromagnet configured to generate an electromagnetic field in a fluid; and
    (2) a pair of electrodes connected arranged opposite each other on the outer surface of said housing, said pair of electrodes configured to produce an electrical signal in response to a velocity of a fluid flowing adjacent said pair of electrodes and through the electromagnetic;
  (c) a surface velocity sensor connectable with said elongated housing, said surface velocity sensor configured to produce an auxiliary electrical signal in response to a velocity of a surface fluid flowing in an open channel, said surface velocity sensor including:
    (1) an auxiliary electromagnet configured to generate an electromagnetic field in a surface fluid; and (2) a pair of auxiliary electrodes connected with said auxiliary electromagnet and configured to produce an electrical signal in response to a velocity of a fluid flowing adjacent said pair of auxiliary electrodes and through the electromagnetic field of said auxiliary electromagnet; and (d) a processor connected with said plurality of sensors and surface velocity sensor, said processor configured to energize said electromagnets and auxiliary electromagnet and sample signals from said plurality of sensors sensors and said surface velocity sensor, whereby when said elongated housing is in contact with a flowing fluid and said processor energizes said plurality of sensors and surface velocity sensor, said sensors communicate said electrical signals to said processor.

2. An apparatus as defined in claim 1, wherein each of said plurality of sensors further includes a differential amplifier connected with said processor, said differential amplifier configured to buffer said pair of electrodes.

3. An apparatus as defined in claim 1, wherein said processor is configured to sample a signal from each of said plurality of sensors sequentially along a length of said elongated housing.

4. An apparatus as defined in claim 3, wherein said processor is configured to energize each of said plurality of sensors sequentially along a length of said elongated housing.

5. An apparatus as defined in claim 1, wherein a distance between each of said plurality of sensors progressively increases from a first end of said housing to a second end.

6. An apparatus as defined in claim 1, wherein said surface velocity sensor further includes an auxiliary housing having at least one side wall, said sensor housing including an attachment mechanism for attachment with said elongated housing, said pair of auxiliary electrodes extending beyond a lower end of said auxiliary housing.

7. An apparatus as defined in claim 6, wherein said attachment mechanism includes a slidable mount.

8. An apparatus as defined in claim 1, wherein said plurality of sensors are symmetrically arranged along said elongated housing sidewall about a midpoint, a distance between each said sensor progressively decreasing from said midpoint to ends of said elongated housing.

9. An apparatus as defined in claim 1, wherein said elongated housing has a generally tubular configuration.

10. An apparatus for measuring the velocity of a fluid, comprising:

(a) an elongated housing having at least one side wall;

(b) a plurality of sensors arranged in spaced relation along said elongated housing at least one side wall, wherein a distance between each said plurality of sensors progressively increasing from a first end of said elongated housing to a second end, each sensor including:

(1) an electromagnet enclosed within said housing, said electromagnet configured to generate an electromagnetic field in a fluid;

(2) a pair of electrodes connected arranged opposite each other on the outer surface of said housing, said pair of electrodes configured to produce an electrical signal in response to a velocity of a fluid flowing adjacent said pair of electrodes and through the electromagnetic; and (3) a differential amplifier configured to buffer said pair of electrodes; and (c) a processor connected with said plurality of sensors, said processor configured to sequentially energize said electromagnets and sequentially sample signals from said plurality of sensors along a length of said elongated housing, whereby when said elongated housing is in contact with a flowing fluid and said processor energizes said plurality of sensors, said sensors communicate said electrical signal to said processor.

* * * * *